(12) United States Patent
Greensides (10) Patent No.: US 6,549,851 B2
(45) Date of Patent: Apr. 15, 2003

(54) REAL-TIME PLANT NUTRITION PRESCRIPTION

(75) Inventor: Thomas W. Greensides, Grimsby (CA)

(73) Assignee: Platte Chemical Company, Greeley, CO (US)

( * ) Notice: Subject to any disclaimer, the term of this patent is extended or adjusted under 35 U.S.C. 154(b) by 134 days.

(21) Appl. No.: 09/816,650

(22) Filed: Mar. 23, 2001

(65) Prior Publication Data

US 2002/0138201 A1 Sep. 26, 2002

(51) Int. Cl.[7] ............................................... G06F 19/00
(52) U.S. Cl. ....................................................... 702/2
(58) Field of Search ..................... 702/5, 2; 706/930; 701/50

(56) References Cited

U.S. PATENT DOCUMENTS

| | | | |
|---|---|---|---|
| 4,992,942 A | * | 2/1991 | Bauerle et al. ............. 706/930 |
| 5,919,242 A | * | 7/1999 | Greatline et al. ............. 701/50 |
| 6,016,713 A | * | 1/2000 | Hale ....................... 73/864.45 |
| 6,119,531 A | * | 9/2000 | Wendte et al. ................. 702/2 |
| 6,178,253 B1 | | 1/2001 | Hendrickson et al. |
| 6,199,000 B1 | | 3/2001 | Keller et al. |

* cited by examiner

Primary Examiner—Donald E. McElheny, Jr.
(74) Attorney, Agent, or Firm—Hogan & Hartson L.L.P.

(57) ABSTRACT

A system and method for translating plant tissue analysis results into nutritional supplement recommendations. A tissue analysis is performed on plant samples from a treatable area of plants. The tissue analysis results indicate current nutrient levels in the plant. The tissue analysis results are applied as inputs to rule-based logic that selects entries from an expert database. The expert database includes nutritional amendment information including specific products, application rates, and application intervals intended to restore the plant nutrient levels to desired values.

18 Claims, 8 Drawing Sheets

| rptno | custno | growname | growcode | labno | id_1 | id_2 | id_3 | farm | field | crpno | crpname | samp_date |
|---|---|---|---|---|---|---|---|---|---|---|---|---|
| C00000-000 | 0 | ACME VINEYARDS | | 0 | 1 | CHARDONNAY | | | | 96 | Grape | 7-Jul-99 |

| anal_date | n | n_rate | n_low | n_high | no3n | no3n_rate | no3n_low | no3n_high | p | p_rate | p_low | p_high | k | k_rate | k_low | k_high |
|---|---|---|---|---|---|---|---|---|---|---|---|---|---|---|---|---|
| - - | 3.5 | H | 2.2 | 2.8 | 0 | | | | 0 | L | 0.25 | 0.45 | 0.41 | D | 1.2 | 1.6 |

| b | b_rate | b_low | b_high | mo | mo_rate | mo_low | mo_high | al | al_rate | al_low | al_high | na | na_rate | na_low | na_high | cl | cl_rate | cl_low | cl_high |
|---|---|---|---|---|---|---|---|---|---|---|---|---|---|---|---|---|---|---|---|
| 63 | H | 35 | 60 | 0 | | | 0 | 0 | ## | | 0 | 0.01 | | 0 | 0 | 0 | | 0 | 0 |

| N 3.50% | HIGH | |
|---|---|---|
| S 0.32% | LOW | DEALT WITH BY THE APPLICATION OF OTHER NUTRIENTS RECOMMENDED HERE |
| P 0.24% | LOW | DEALT WITH BY THE APPLICATION OF OTHER NUTRIENTS RECOMMENDED HERE |
| K 0.41% | VERY LOW | 3 APPLICATIONS OF 7 POUNDS PER ACRE NOTRACE 10-16-38 IN MIN. 50 GAL. OF WATER 7-10 DAYS APART |
| Mg 0.73% | VERY HIGH | |
| Ca 1.61% | SUFFICIENT | |
| B 63 | HIGH | |
| Zn 59 | SUFFICIENT | |
| Mn 250 | HIGH | THIS HIGH LEVEL MAY BE A RESULT OF PREVIOUS PESTICIDE APPLICATION |
| Fe 157 | SUFFICIENT | |
| Cu 13 | SUFFICIENT | |

RECOMMEND ADDITIONAL TISSUE SAMPLE BE TAKEN 21-28 DAYS FROM THIS SAMPLE

*FIG. 5*

Product Recommendations

- Dealt with by the application of other nutrients recommended here that contain sulfur.
- This product can be applied with other nutrients recommended here.
- Can be applied in combination with other nutrients at the time recommended.
- Can be applied in combination with other nutrient(s) recommended here.
- At this moderately sufficient level this crop would benefit crop could benefit from
- This high level could be a result of a previous pesticide application.
- Of no concern on this crop.
- Recommend an additional tissue sample be taken and analysed 21-28 days from this sample.
- Review soil applied fertilizer rate and adjust if warranted.
- Do not apply products containing more than traces of this nutrient.
- Do not recommend the application of this nutrient on this crop at this time.
- Dealt with by the application of other nutrients recommended here.
- No foliar treatment recommended at this time. Review soil fertility tests as they apply to this nutrient
- Application of any foliar applied nutrients not recommended at this time.
- Recommend post harvest application of BOROSOL 10 1Pt/Ac plus CITRAPLEX ZINC 25% 2Pts/Ac on this crop.

| | |
|---|---|
| N | 3 Applications of 4 Lbs/Ac Nortrace 28-8-18 in min. 50 gal. of water 7-10 days apart.<br>2 Applications of 4 Lbs/Ac Nortrace 28-8-18 in min. 50 gal. of water 7-10 days apart.<br>3 Applications of 7 Lbs/Ac Nortrace 28-8-18 in min. 50 gal. of water 7-10 days apart.<br>2 Applications of 7 Lbs/Ac Nortrace 28-8-18 in min. 50 gal. of water 7-10 days apart. |
| S | 2 applications 2 Pts/Ac Nortrace flowable sulfur in minimum 50 gal. of water 7-10 days apart.<br>Apply 2 Pts/Ac Nortrace flowable sulfur in minimum 50 gal. of water.<br>At this level sulfur is dealt with by the application of other nutrients containing sulfate-sulfur.<br>... |
| Zn | 3 Applications, 1 Lb/Ac of CITRAPLEX ZINC 25% 7-10 days apart in min. 50 gal. of water.<br>2 Applications, 1 Lb/Ac of CITRAPLEX ZINC 25% 7-10 days apart in min. 50 gal. of water.<br>Do not apply Zinc to this crop at this time. Apply 1 Lb/Ac CITRAPLEX ZINC 25% + 1Pt/Ac BOROSOL 10 po<br>150.00% Level at which high pesticide warning. |
| Mn | 2 Applications, 1 Lb/Ac of CITRAPLEX MANGANESE 20% 7-10 days apart in min. of 50 gal. of water.<br>Apply 1 Lb/Ac of CITRAPLEX MANGANESE 20% in min. of 50 gal. of water.<br>125.00% Level at which high pesticide warning. |

605 — 3 Number of products to be applied at one time.

50.00% % of K between high & low above low for additional application
50.00% % of Zn between high & low above low for additional application
50.00% % of B between high & low above low for additional application
50.00% % of Ca between high & low above low for additional application
25.00% % of Mg between high & low above low for additional application 2 Highest # of nutrients to be applied if extra applications warranted

603

FIG. 8

REAL-TIME PLANT NUTRITION PRESCRIPTION

BACKGROUND OF THE INVENTION

1. Field of the Invention

The present invention relates, in general, to precision agriculture methods, and, more particularly, to software, systems and methods for real-time or near real-time nutrient management based upon plant tissue analysis.

2. Relevant Background

Plants require many nutrients to grow, blossom and fruit. Most preferably, the essential nutrients needed for plant nutrition are present in adequate amounts in the soil. More commonly, one or more of the essential nutrients must be added to the soil by application of fertilizers containing nutrients in which a particular soil is lacking. Under a number of growing conditions, essential nutrients may be present in the soil in sufficient quantities, but may not be readily accessible to the plants for uptake and translocation, in which case combinations of fertilizers and plant growth enhancing compounds are applied before, during and/or after planting.

The essential nutrients include macronutrients (e.g., nitrogen "N", phosphorus "P" and potassium "K") which are needed by plants in relatively large quantities. The essential nutrients also include secondary nutrients (calcium "Ca", magnesium "Mg" and sulfur "S") which are required in lesser quantities. Micronutrients are essential nutrients which are needed in very small amounts and include iron "Fe", manganese "Mn", copper "Cu", zinc "Zn", molybdenum "Mo", chlorine "Cl" and boron "B". Although important, over supply of micronutrients can lead to toxicity and significant production loss consequently the indiscriminate use of micronutrient supplements can have harmful results.

Nutrient management is an increasingly difficult and yet increasingly important task. According to a long-standing principle known as Liebig's Law of the minimum, the yield of a plant is limited by the lack of a single nutrient even though there may be sufficient quantities of all the other essential nutrients. Waiting until plants show visible signs of a nutrient imbalance to establish which nutrient is limiting production, a condition often referred to as nutrient deficiency, is often too late to take effective remedial action. Plant yield has already been negatively impacted by a deficiency condition and even when the insufficiency can be remedied, production loss has occurred. All too often plants deficient in one or more nutrients cannot be saved. The challenge then is to proactively establish and supplement the nutrient or nutrients limiting production prior to the appearance of visual symptoms. Hence, the need for nutrient management systems and methodologies that enable practical treatment of nutrient shortfalls before they become deficiencies.

Historically, users managed nutrients using historical performance data and soil analysis. Before and sometimes after planting, nutrients are applied (e.g., nitrogen, zinc, etc.) to achieve soil nutrient levels matching previous seasons that had produced suitable results. However, plant requirements change from year to year, as a result of a number of environmental factors, and the ideal nutrient levels one year may produce sub-optimal results in another year. Further, nutrient management will be made more complex by increasingly strict regulations on the quantity and type of amendment that can be added directly to soil. Soil-applied nutrients tend to migrate into surrounding land and water supplies and may impact the ecosystem of these surrounding areas. As a result, regulations and self-imposed restrictions will limit the amount and timing of soil-applied nutrients.

Foliar nutrient supplements can be applied after planting to correct nutrient shortfalls. Foliar supplements are taken up into the plant much more efficiently than soil supplements, and therefore can reduce the amount of nutrients that must be added to the soil. Foliar supplements, however, are much more difficult to manage than soil supplements. Foliar supplements often benefit from sequential application of particular supplements at specific concentrations at specified time intervals. Some supplements may be applied at one time while others benefit from staggered application. Interactions between supplements and/or the crop protection products they are applied with may prevent application in certain combinations or at certain times during a growing season. Ideally, each case is managed individually to account for individual plant needs and production goals. However, selecting suitable nutrient supplements and timing schedules to correct particular nutrient shortfalls is problematic, time consuming, and generally beyond the capacity of the applicator responsible for managing the application.

In the past, foliar products were applied as a routine application where the particular products, and application timing were based upon a best guess or estimate of what was thought to be plant requirements at that time. Application rate of individual nutrients was kept low to guard against any danger of toxicity. This ad hoc approach does not take in to account variation in seasonal environmental factors. There is no attempt to target particular nutrients that may be short as a result of events of that season and therefore this method tends to produce inconsistent results from season-to-season. This approach fails to take into account the principles of Liebig's Law in that there is no attempt to establish which nutrient or combination of nutrients is limiting production in the current plant under the environmental factors of that season. Applications of broad-spectrum nutrients are made hoping they contain some of the correct nutrient to address the problem and often fail to provide sufficient quantities of the required nutrient.

Historically, users would manage the levels of a handful of key nutrients within the soil. As technology progresses, the number of nutrients that can be managed becomes unwieldy, making it difficult to implement state-of-the-art information and knowledge into a nutrient program. Trace nutrients, in particular, are difficult to manage and may easily result in serious impact to plant production. Moreover, environmental conditions such as temperature and rainfall may temporarily affect nutrient uptake such that even with near ideal soil levels part of the plants potential is lost to malnutrition. Hence, a need exists for a system and method that readily enables users to develop a comprehensive, prioritized and orchestrated nutrition program that adapts to real-time plant needs.

Recent technological advances have resulted in farm management approaches generally referred to as "precision farming". These approaches generally involve analysis of specific plant and soil needs. In practice, users can apply fertilizers, herbicides, and pesticides at variable rates within their fields in response to specific plant and soil needs, rather than a uniform rate without regard to plant variability. Precision farming techniques promise to increase farm profits and decrease environmental impact of farming.

In large part, precision farming involves remote sensing techniques to map within-field plant and soil conditions.

While remote sensing has advantages of being able to analyze large areas of land quickly, the amount of information about specific plant and soil needs that can be derived from remote sensing is limited. Several techniques are available to detect nitrogen deficiency, for example, but comprehensive analysis of a variety of nutrients is not possible. Instead, remote sensing provides a means to distinguish healthy from unhealthy plants, leaving the user to institute remedial strategies for unhealthy plants manually.

Often, remedial action for a particular plant need must occur within days of identifying the need. The difficulty in assessing remedial procedures to identify suitable nutrient amendments delays the user's response to arising issues such as excess rain, drought, or unusual temperature conditions and the like. Preferably, users need a system for identifying nutrient requirements and corrective measures before a deficiency becomes apparent and affects current plant production.

One method of obtaining detailed information about plant and soil needs is through laboratory analysis such as tissue analysis. Tissue analysis provides information about what nutrients the plant is actually obtaining from the soil and the effect of current weather on nutrient levels. In theory, in-season tissue analysis helps the user evaluate the effectiveness of an already applied nutrient program, and allows for corrective action to maximize a plant's potential. This allows a nutrient program to be adapted to current plant and soil needs rather than being based on historical needs that may or may not be relevant to the current season.

Currently, the use of tissue analysis is sporadic at best, as producers generally know that testing is available but are unaware of a practical application. Those producers that do use tissue analysis generally use it late season and use it to evaluate their soil-applied fertilizer program. As well, there is very little use in field crops as most tests are done on higher value perennial crops. One problem with late-season analysis is that at this point there is little any one can do to correct nutritional shortfalls of the plant that impact both plant health and the current year's production. The test simply provides a "snapshot" of the late season nutritional status of the plant under the environmental conditions of the last season (temperature, rainfall, crop load, hours of sunshine or any other naturally occurring events that impact how plants obtain nutrients). It is difficult to determine exactly what should be done the next year as it relates to soil-applied fertilizer rates. Any of the environmental factors can and will change and over application of some of the micronutrients can be toxic to the plant.

Another problem of this approach is that a single late-season analysis does not measure the requirements of the plant over time throughout the season. For example Boron is very important for the reproductive stage of the plant. The greatest need for this nutrient occurs at bloom and fruit set and even the number of blossoms on a plant can impact boron levels at that time-late season analysis can not measure boron levels at bloom nor does it provide any opportunity for correction. This is further complicated because environmental conditions that impact uptake may have changed dramatically from earlier in the season. Further, it is difficult to determine which nutrients are most important and need to be treated first in order to help improve the uptake of other nutrients. Hence, there remains a need for a plant nutrition system and method that alleviates this discomfort and provides sound, precise recommendations that growers can follow as a "prescription" for correct nutrition that are not only effective but are safe to the plants as well.

Users often prefer to manage nutrient levels to achieve particular results in their plants. Unfortunately, nutrient suppliers may supply recommended nutrient levels that have shown to provide suitable results, however, these recommended levels may not produce the user's target and preferences. Hence, a need exists for a plant nutrition management system and method that enables user input to select target nutrient levels, and proscribes nutrient supplements to achieve those target levels.

SUMMARY OF THE INVENTION

Briefly stated, the present invention involves a system and method for translating plant tissue analysis results into nutritional supplement recommendations. A tissue analysis is performed on plant samples from a treatable area of plants. The tissue analysis results indicate current nutrient levels in the plant. The tissue analysis results are applied as inputs to rule-based logic that selects entries from an expert database. The expert database includes nutritional amendment information including selected specific products, application rates, and application intervals intended to restore the plant nutrient levels to desired values.

DETAILED DESCRIPTION OF THE PREFERRED EMBODIMENTS

The present invention is directed to systems, methods, and particularly software managed methods for prescribing nutrient supplements to a plant based upon in-season plant tissue analysis. The present invention is also directed to a system that supplies nutrient recommendations that are consistent and can be supplied to growers generally in less than 48 hours, and follow a set of agronomic principles built into the an expert database and rule-based logic implemented by a computer program. In this manner, the invention enables users to translate tissue analysis results directly into remedial and prescriptive nutritional supplement strategies that improve plant potential and/or accomplish specific user-initiated nutritional goals.

Particular implementations of the present invention enable producers to follow the principles of Leibig's Law by prioritizing nutrient strategies to address particular nutrients that are limiting production of a current plant. Also, particular implementations enable producers to safely and effectively apply multiple nutrient products by evaluating interactions between products. Other particular implementations enable producers to implement complex nutrient strategies over time that are responsive to particular real-time plant needs that proactively address nutrient shortfalls before they become deficiencies, although the present invention could be readily used to treat nutrient deficiencies as well.

Figure 1:
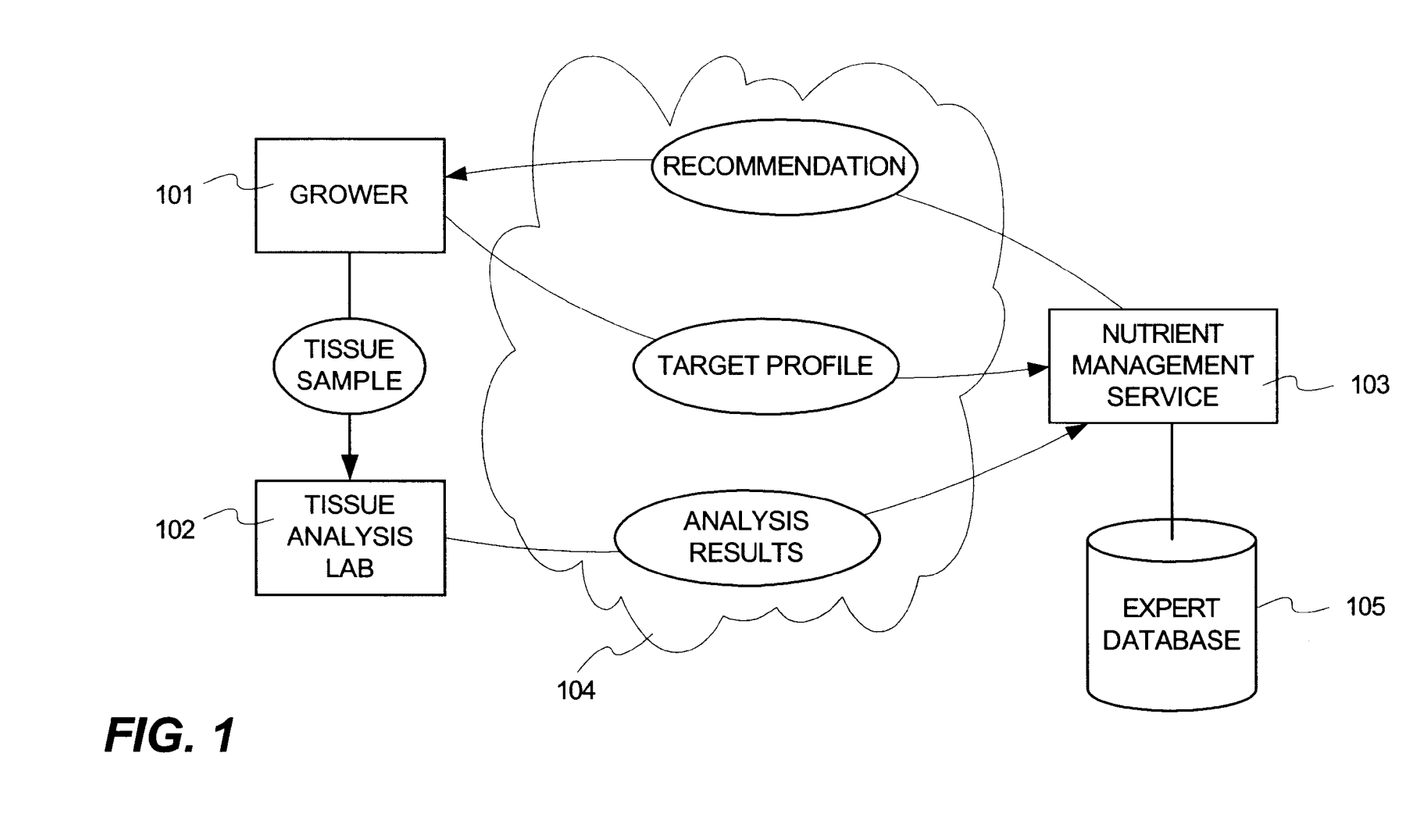
FIG. 1 illustrates entities and relationships in a nutrient management system in accordance with the present invention.

FIG. 1 illustrates relationships between entities in a plant nutrient prescription system in accordance with the present invention. Producer, operator or employee at location 101 obtains tissue samples at selected times or intervals from field plants, turf, perennial plants, greenhouse plants, ornamental plants, grasses or the like. Although a chemical analysis of plant material can be performed on virtually any portion of a plant, the particular concentrations in any sample will vary by age, nutrient being sampled, plant species, time of season, and the like. For example, often times the nutritional status of a plant is better reflected in the mineral content of the leaf than of other plant organs. In fruit trees, on the other hand, the fruit itself may be a better indicator of nutritional status at particular times during the season. Hence, specific plant parts or organs may be appropriate for particular analysis.

The tissue sample is sent to a tissue analysis lab 102. Tissue samples may optionally be washed prior to analysis to remove contaminants from dust or sprays. The tissue analysis lab 102 is equipped to analyze tissue samples and generate reports (such as reports 301 shown in FIG. 3) that indicate current nutrient levels of various nutrient compositions within the tissue sample.

The tissue analysis results are transmitted by phone, facsimile, electronic mail, or other physical or electronic data transport mechanism to nutrient management service 103 over communication network 104. Nutrition management service 103 receives the analysis results and formats the results into an appropriate form for automated interpretation. This may involve manual entry or optical character recognition of manual reports. Preferably, analysis results are transmitted digitally in a manner that enables the data to be loaded into and accessed by software processes implemented by the nutrient management service 103.

In a particular example, analysis lab 102 transmits analysis results in an electronic publishing form that requires a viewer such as FolioViews or a runtime variant thereof. In this particular example raw analysis results are saved to a format that is compatible with a more versatile data manipulation engine such as Microsoft Excel or Microsoft Access software packages. These packages are only examples of useful, user programmable data manipulation engines. Other commercial data manipulation products are available. Moreover, custom or semi-custom software may be readily developed with suitable interfaces to receive analysis results and implement the interpretation processes described hereinbelow.

Figure 4:
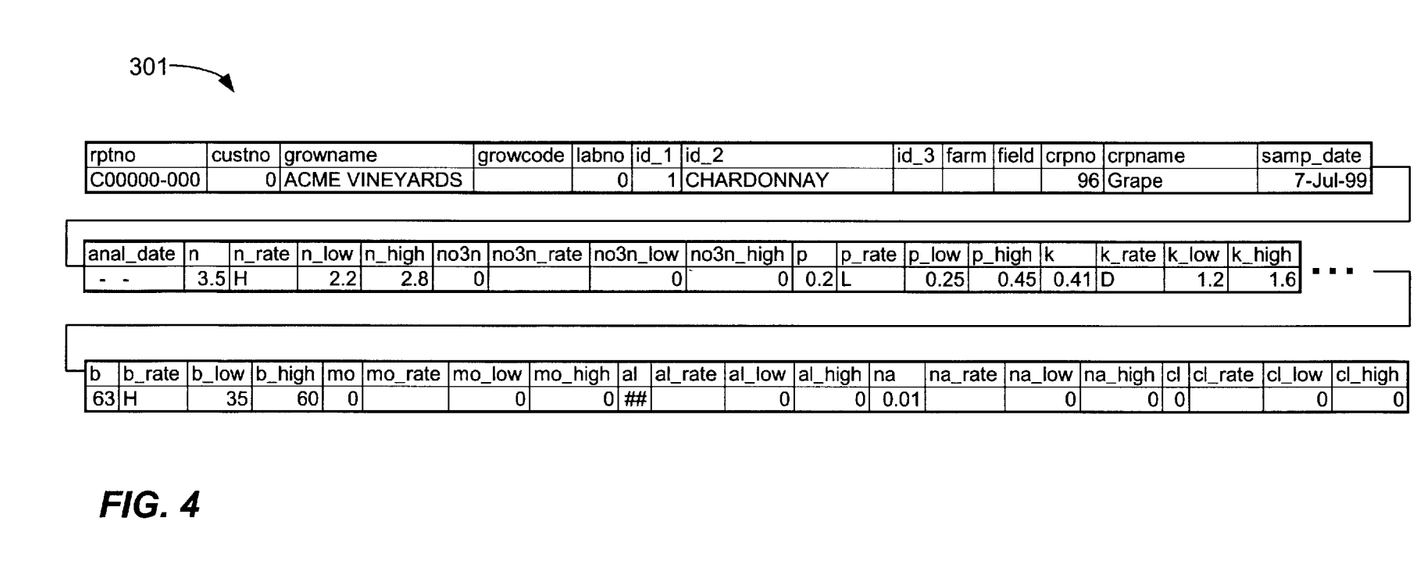
FIG. 4 shows a plant tissue analysis report of FIG. 4 in a structured data format.

Nutrition management service 103 uses the data from the analysis results as inputs to one or more rule-based logic components. The rule-based logic components implement if-then type logic to select entries from an expert database 105. Expert database 105 can be implemented as a simple data structure such as a table, relational database, or the like comprising a plurality of entries, where each entry includes recommendations from a human expert that enables the program to simulate the judgment and behavior of the human expert. This is in contrast to a table or data structure that holds simple data or attribute values that do not simulate human expertise. The selected entries are compiled into a recommendation report, an example of which is shown in FIG. 4, that is sent to a user at location 101. Optionally, location 101 may provide target profile information to nutrient management service 103 indicating target or desired nutritional goals of one or more nutrients as perceived by the operator of location 101.

It is contemplated that it would be possible with the present invention to collect a geographically dispersed set of tissue samples representing different fields or portions of fields. The recommendation reports generated by the present invention may be implemented at any desired level of granularity based upon the number and separation of plant samples taken. In this manner, a producer may manage their fields at any desired level of precision. Similarly, tissue sample and nutrition recommendations in accordance with the present invention can be performed at any desired time interval to enable proactive, nearly continuous nutrient management.

Figure 2:
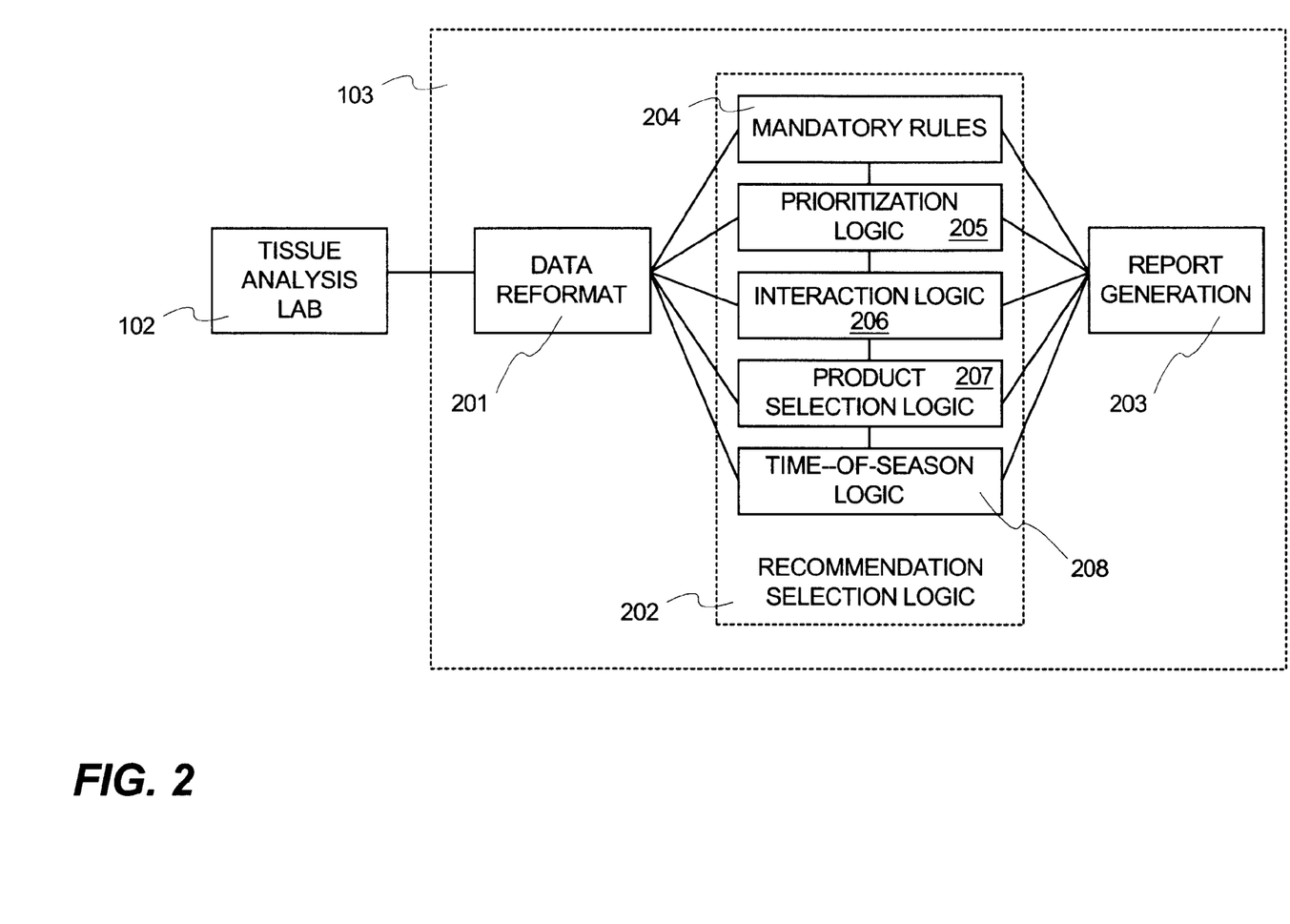
FIG. 2 shows component processes and data exchanges in a particular implementation of the present invention.

FIG. 2 shows an exemplary set of component processes implemented within nutrient management service 103. Tissue analysis results are received by data formatting processes 201 that function to convert the native data format presented by tissue analysis lab 102 into a useable format for the rule-based logic implemented by recommendation selection logic processes 202. In the particular examples, the tissue analysis results are presented in a Folioviews data structure that is converted manually and/or automatically into an Excel spreadsheet format. Data format processes 201 may be unnecessary in applications where the native format of the tissue analysis report can be manipulated directly by the rule-based logic 202.

Rule-based logic 202 comprises a plurality of processes that operate together to select particular elements from expert database 105 (shown in FIG. 1). Expert database 105 is structured as a plurality of entries where each entry articulates a response to a particular set of conditions such as plant type, plant growth stage, nutritional component, and deviation of the nutritional component levels from a target or desired value. In essence, each entry in expert database 105 comprises a variety of expert knowledge about nutritional products, application rates, application timing sequences, and the like that would be difficult or impractical to implement in the form of rule based logic. However, rule-based logic components 202 are used to select amongst the various expert database entries to handle selection logic that is readily implemented as a set of rules.

By way of example, rule based selection logic 202 includes processes 204 that implement mandatory rules for a given nutritional supplement, processes 205 that implement prioritization logic to preferentially select entries associated with plant-restricting nutritional shortfalls, interaction processes 206 that cross-check products for undesirable interactions, product selection logic 207 that operate to compare current plant nutrient levels to target nutrient levels and select products that ameliorate shortfalls, and processes 208 that select time-of-season specific recommendations from expert database 110.

FIG. 2 suggests a neat separation between the rule-based processes for purposes of illustration. It is contemplated that some implementations may realize a programmatic architecture that mirrors the logical separation of FIG. 2 closely, particularly with object oriented design techniques. However, the current implementation of the processes shown in FIG. 2 using an Excel spreadsheet involves a plurality of cells with procedural and Boolean logic statements implemented therein. Hence, the present invention contemplates a wide variety of implementations including improvements to the specific implementation described herein which may result in simpler programming, easier maintenance, and/or performance improvements.

Product selection processes 207 perform an essential function of comparing the nutrient levels in a current sample to a desired set of nutrient levels. The desired set of nutrient levels may be statically defined in the program, selected by the user for whom the analysis is being performed, or provided by a third party source such as a textbook, consultant, agricultural extension office or the like. Processes 207 detect deviations between the current nutrient levels and the target nutrient levels. In a particular implementation, the deviations for each nutrient are classified as "very low", "low", "sufficient", "high", or "very high", although a smaller or larger number of classifications is readily implemented (e.g., a scale from 1 to 10). For each nutrient, the classification or computed deviance points to particular entries in the expert database 105. For example, when a shortfall in potassium is detected, processes 207 will point to or select an entry in expert database 105 relating to a particular potassium supplement, application rate, and application timing schedule.

The set of entries pointed to by product selection processes 207 represent an interim set, as opposed to a final set, of selections in that the other rule-based logic components may eliminate or change certain selections as described below.

Mandatory rules processes 204 select specific rules that must be presented whenever a particular nutritional shortfall is detected, or whenever processes 207 select particular products. For example, when a Boron supplement is recommended, a general warning "DO NOT MIX Boron with any pesticides in soluble packaging" is selected by mandatory rules processes 204.

Prioritization logic processes 205 enable the set of selected products to be narrow to a subset of products that address the most critical needs of the plant being analyzed. As noted hereinbefore, a single nutrient shortfall can limit plant production. The present invention recognizes that supplying the single nutrient or nutrients that are liming productivity is of greater priority that supplying other nutrients that are not currently limiting productivity, even when a shortfall is detected in other nutrients. Often times there is a practical or empirical limit on the number of supplements that can be applied to a plant at one time. By way of example, the present invention limits the simultaneous application of supplements to three or four products. This constraint may mean that some nutrient shortfalls cannot be treated. Prioritization logic processes 205 asses which of the detected nutrient shortfalls should be treated first. By treating the limiting nutrient shortfalls first, plant potential can be maximized, even though some nutrient shortfalls are not addressed.

Interaction logic processes 206 further constrain selections from database 110 to prevent selection of recommendations for incompatible products. At one level, interaction processes 20 can be implemented statically by restricting the pool of products that can be prescribed to a pool of entirely inter-compatible products. This solution, however, limits the variety of products that can be prescribed by the present invention. Alternatively, interaction processes 206 cross-check the recommendations from expert database 110 identified by processes 207, 204, and 205 to remove or alter incompatible selections. Incompatible selections mean selections that are associated with products or products that contraindicate use of one or more other selected products.

Time of season logic processes 208 act to modify the selection of entries from expert database 110 when the selections are inappropriate given the maturity of the plant in a particular growing season. For example, despite detection of a Zinc shortfall, it is inadvisable to apply Zinc supplements to determinate plants near harvest. Hence, time of season logic processes 208 act to deselect any recommendations from expert database 110 relating to immediate foliar supplements in favor of recommendations for late-season foliar or soil nutritional supplements.

Selection processes 202 operate in cooperation and in parallel to select a set of entries or recommendations from expert database 110. The final set of selected entries is compiled in process 203 to generate a recommendation report. The recommendation report comprises a list or prescription of specific actions and specific products that can be used by the user to apply nutrients in a manner that will realize the full potential of the current plant being analyzed.

Figure 3:
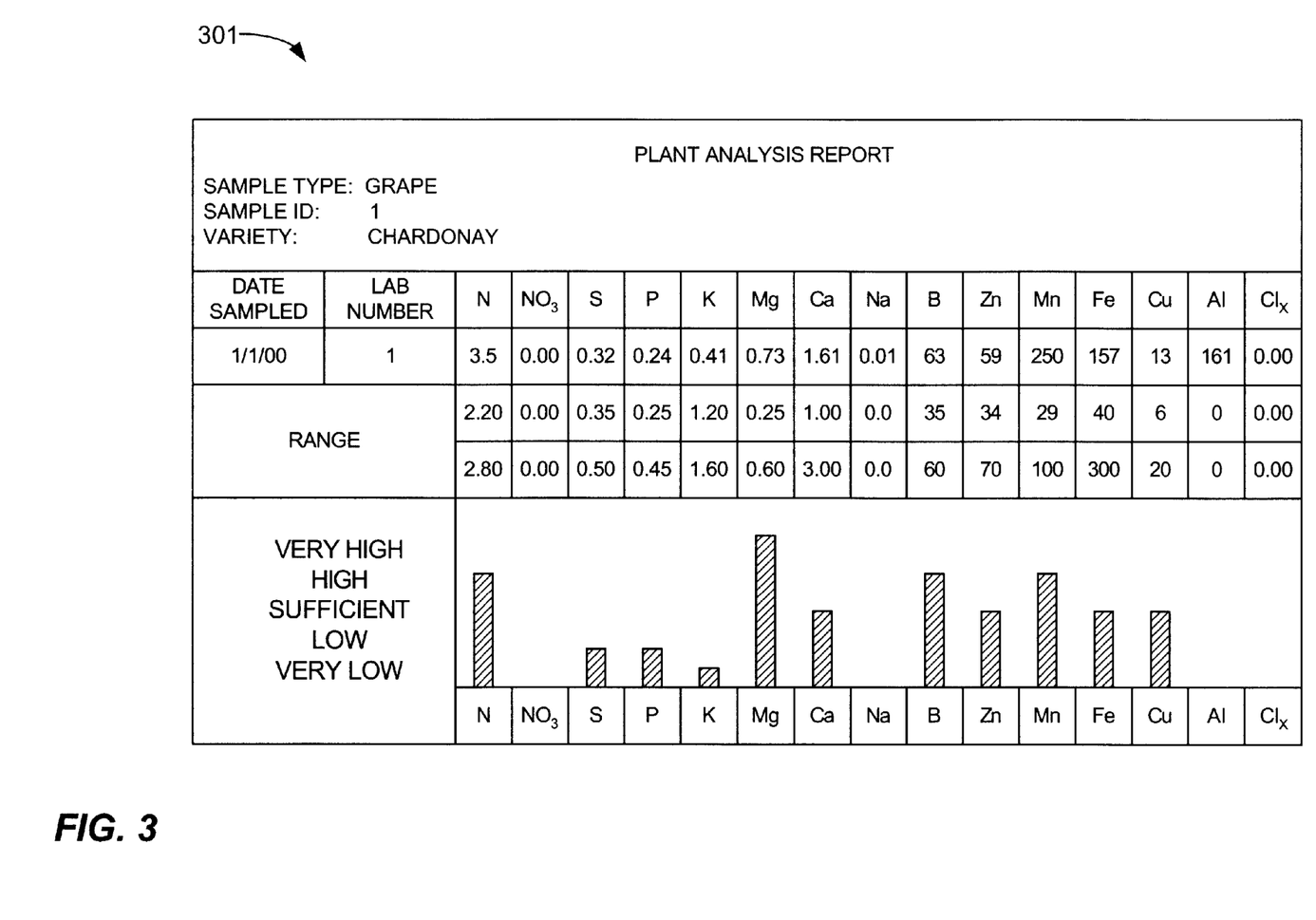
FIG. 3 illustrates an exemplary plant tissue analysis report in a graphical form.

FIG. 3 illustrates a graphical version of a tissue analysis report. FIG. 4 illustrates a similar report provided in an arbitrary data structure that is more readily implemented in the spreadsheet-based implementation of the particular examples. Such a report presents raw data and provides a minimal level of interpretation or classification of the raw data. Notably, while the report points out nutrient shortfalls, it in no way expresses which shortfalls are priorities, recommendation of products or treatment plans to address the shortfalls, nor interactions between products that might be used to address shortfalls.

The raw data does include indications of high and low watermarks for each nutrient, which will vary from lab to lab. These high and low levels for each nutrient are based on standard agricultural information provided by government resources, trade groups, individual consultants, or the like and may or may not accurately reflect ideal values that will satisfy a particular user's needs.

Figure 5:
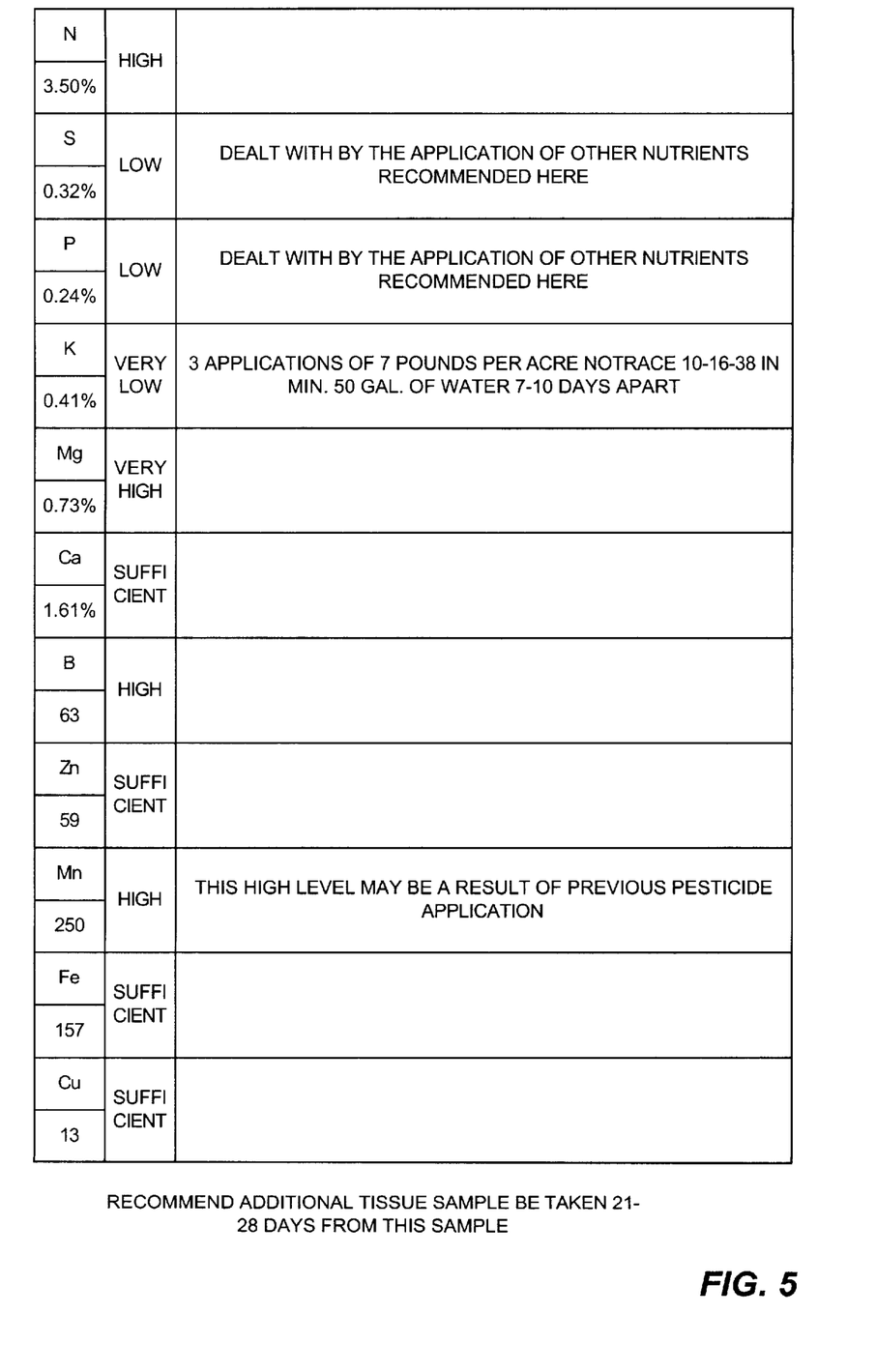
FIG. 5–FIG. 8 illustrate exemplary components of an expert database in accordance with the present invention.

In stark contrast with the raw data presented by the tissue analysis reports of FIG. 3 and FIG. 4, FIG. 5 illustrates a nutrient prescription report generated in accordance with the present invention. The combined action of rules-based processes 202 and expert database 110 produces a set of specific products, product application rates, and application timing schedules on a nutrient-by-nutrient basis. The "very low", "low", "sufficient", "high" and "very high" labels may or may not coincide with the classifications provided in the tissue analysis report depending on whether rules-based logic 202 uses the same high/low watermark values for each nutrient. Significantly, the nutritional prescription report shown in FIG. 5 goes beyond the mere classification of nutrient deviations to recommend specific remedial or pro-active actions selected to move or align the plant's nutrient levels to a desired level. The specific recommendations are based on expert knowledge, while the logic used to select the specific recommendations are based upon rules that receive the current nutrient levels as inputs. This combination results in a simple, easy to follow treatment regiment that addresses the current nutritional needs of the plant in a coordinated, comprehensive and systemic manner.

Figure 6:
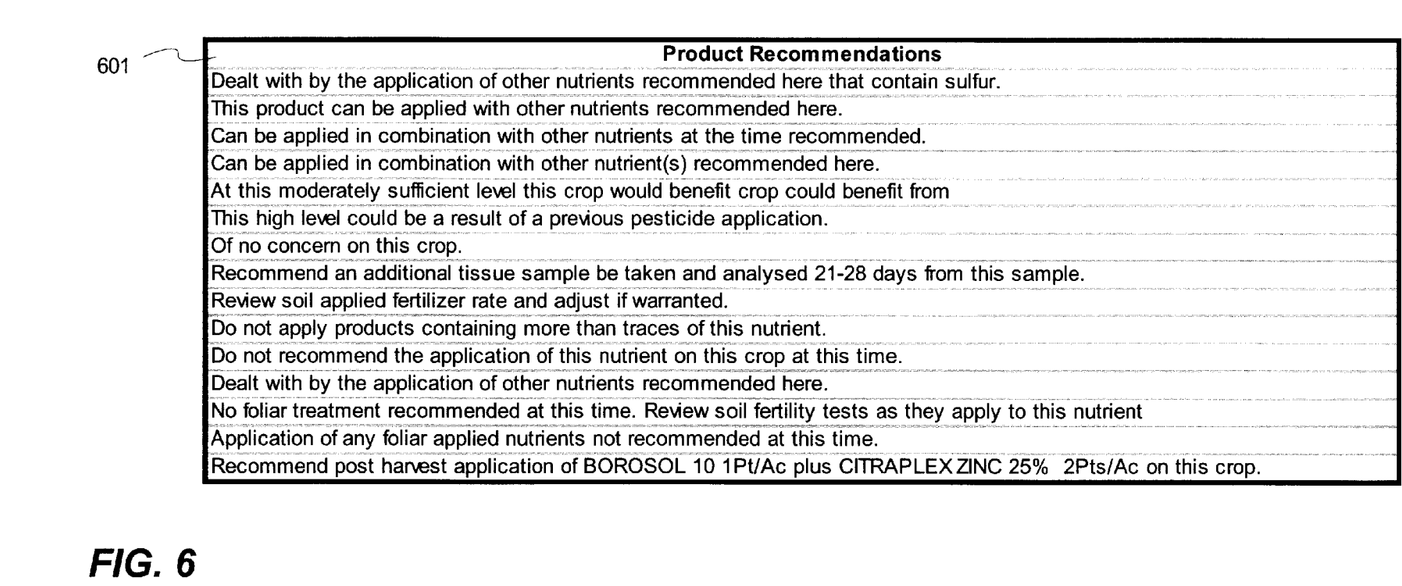
Figure 7:
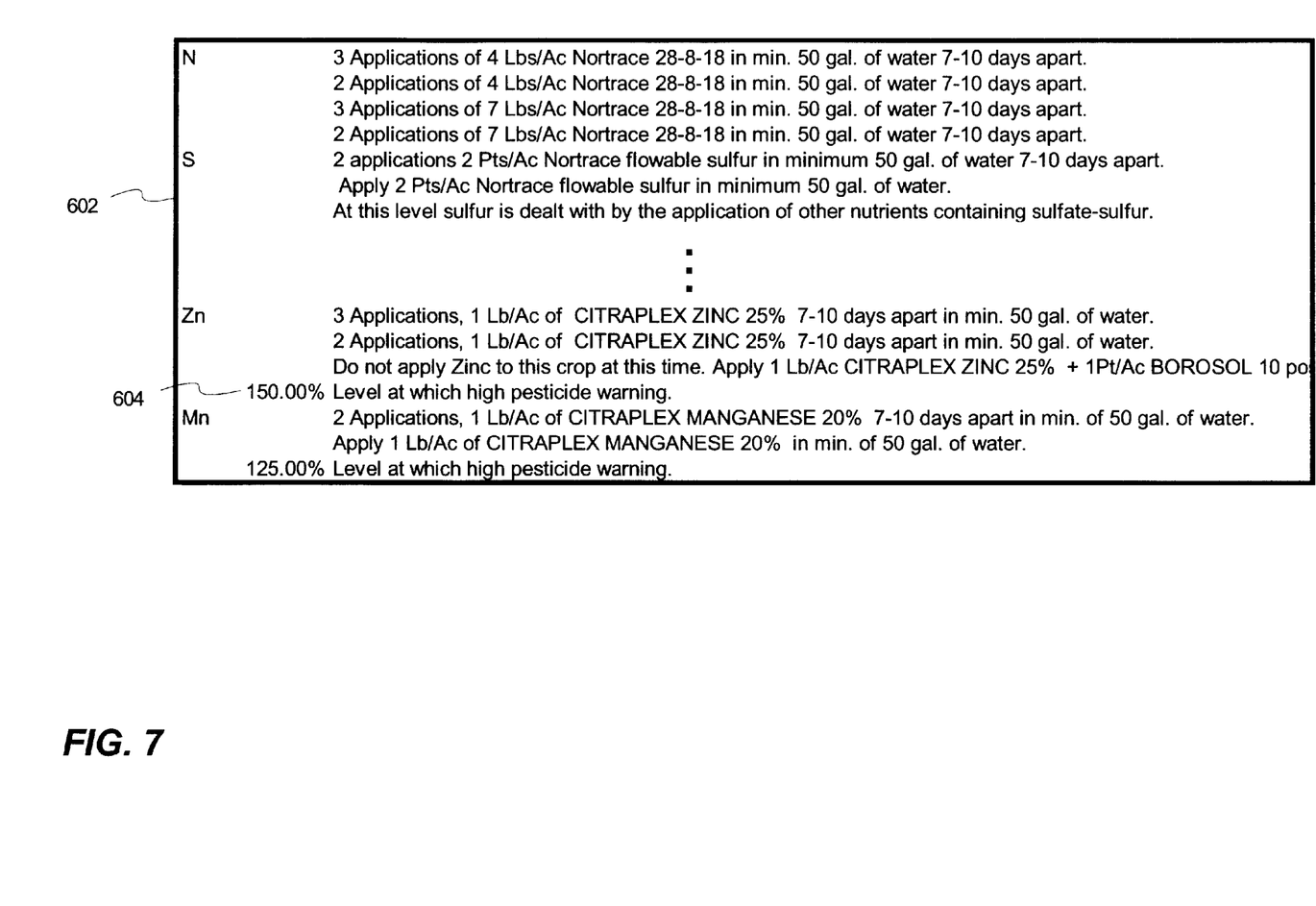
Figure 8:
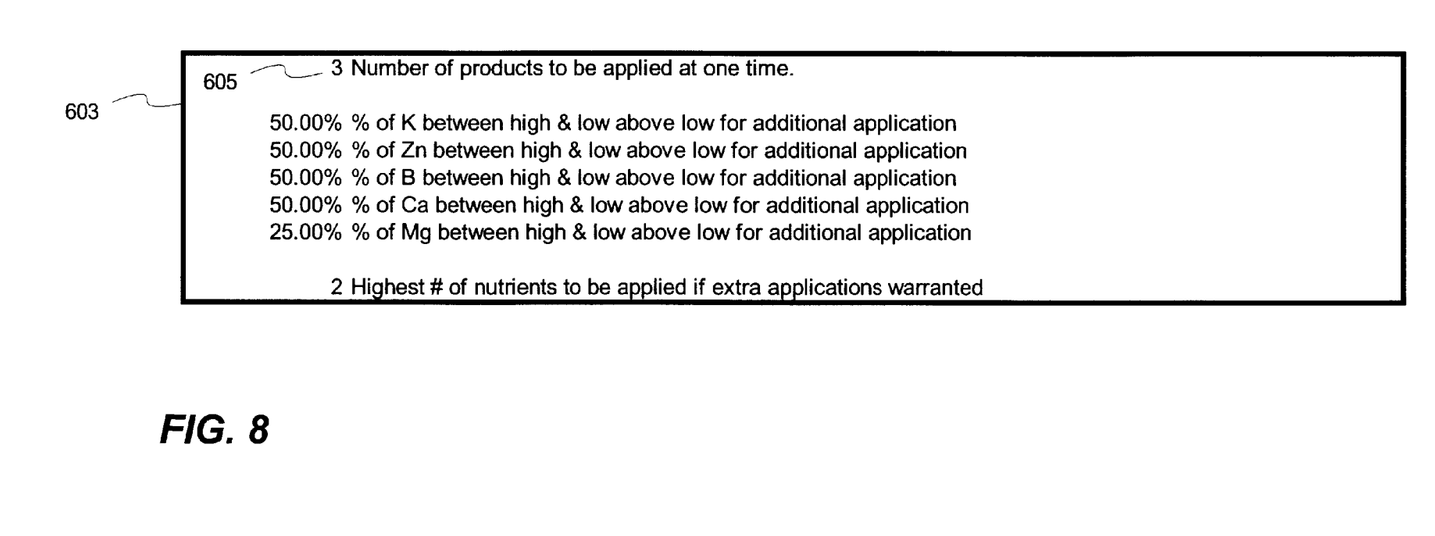

An exemplary structure for expert database 110 is shown in FIGS. 6–8. In an exemplary implementation the data structures shown separately in FIG. 6–FIG. 8 are implemented in a unitary data structure such as an Excel spreadsheet. FIG. 6 shows a set of "general" recommendations that may be applicable to any nutrient. These often involve explanations for why a nutrient product is not suggested despite a detected shortfall, notifications or warnings about particular products such as may be selected by mandatory rules processes 204, or recommendations for actions beyond application of products. Entries from the latter class of recommendations are selected, for example, when prioritization processes 205 have determined that a particular nutrient should not be supplemented by foliar supplements because higher priority nutrients must be addressed first.

FIG. 7 shows a set 602 comprising a plurality of nutrient-specific entries in expert database 110. Each nutrient may be associated with a plurality of entries where each entry includes a prescription for a particular product, application rate, and application frequency. When a nutrient shortfall is detected, rules-based logic components 202 cooperatively act to select one of the available entries, or select one of the general recommendations shown in FIG. 6 when selection of an entry in FIG. 7 is contraindicated. FIG. 7 shows recommendations for only Nitrogen, Sulfur, Zinc and Magnesium, although it should be understood that similar entries would be provided for each nutrient being analyzed. Also, each nutrient may be associated with any number of recommendations to meet the needs of a particular application.

Optionally, entries such as entry 604 may include trigger points that indicate when the entry may be applied. These trigger points could alternatively be implemented within rules-based logic components 205, however, implementation within expert database 110 enables ready manipulation by the expert. The trigger point of 150% shown in entry 604 is essentially a mandatory rule that causes the associated entry to be selected when the Zinc level is 150% of the high value.

FIG. 8 shows a set of miscellaneous recommendations 603 illustrating how additional expert recommendations can be added and used by the present invention. Recommendation 605, for example, establishes a maximum number of products that can be applied at any time. This value ("3" in the example of FIG. 8) is used by prioritization processes 205 to narrow the total number of entries selected from set 602 to a subset that involves no more than the specified maximum number of products. Recommendations that are associated with non-priority nutrients are eliminated from the final report shown in FIG. 5 in favor of general recommendations selected from the set 601 shown in FIG. 6.

The remaining entries in set 603 comprise modifiers that provide alternate recommendations that are selected under specific conditions identified by the rule-based logic components 202. In the example of FIG. 8, the modifiers provide recommendations that can be selected when a particular nutrient is in the "sufficient" range. Ordinarily, the sufficient range indicates no action is required by the grower. However, the sufficient range is large in many circumstances and so growers may wish to apply nutrient supplements proactively to maintain the plants in the sufficient range. The modifiers shown in recommendation set 603 provide such flexibility under control of experts.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method of prescribing plant nutrients comprising:
   obtaining tissue analysis results for plant samples from a treatable area of plants, the tissue analysis results indicating a current nutrient level in the plant;
   providing an expert database of nutritional supplement recommendations;
   using the tissue analysis results to select entries from the expert database; and
   compiling the selected entries to form a prescription for plant nutrients.

2. The method of claim 1 wherein the step of selecting entries comprises applying the tissue analysis results as inputs to rule-based logic, wherein the rule-based logic selects the entries from the expert database.

3. The method of claim 1 wherein the expert database includes nutritional supplement information including specific products, application rates, and application intervals intended to restore at least one plant nutrient level to a desired value.

4. The method of claim 1 further comprising combining a soil analysis result with the tissue analysis results in the act of determining a nutritional amendment plan.

5. The method of claim 1 wherein the prescription accounts for current environmental conditions and current plant needs.

6. The method of claim 1 wherein the act of selecting entries from the expert database comprises:
   selecting at least one product from a set of available nutritional supplement products; and
   selecting a sequential application regimen from the selected product.

7. The method of claim 1 wherein the act of selecting entries from the expert database comprises:
   selecting a plurality of products from a set of available nutritional supplement products; and
   selecting a sequential application regimen for each of the selected products taking into consideration cooperative and destructive interference from each of the selected products on others of the selected products.

8. The method of claim 1 wherein the act of selecting entries from the expert database comprises prioritizing various nutrient shortfalls indicated by the tissue analysis results and determining the nutritional amendment plan so as to preferentially support shortfalls of high priority nutrients as compared to low priority nutrients.

9. The method of claim 1 wherein the tissue analysis indicates plant nutrient levels selected from a group consisting of nitrogen, sulfur, phosphorous, potassium, nitrates, zinc, iron, copper, manganese, calcium, magnesium, sodium and boron.

10. The method of claim 1 wherein the prescription comprises a selection of foliar supplements and an application schedule for the selected foliar supplements.

11. The method of claim 1 wherein the act of selecting entries from the expert database comprises:
    comparing the tissue analysis results to a predefined standard for a particular plant;
    identifying deviations from the predefined standard; and
    selecting the entries from the expert database such that the selected entries describe actions that will cause nutrient levels in the plant to approach the standard.

12. The method of claim 1 further comprising:
    receiving a user-input target nutritional profile for particular supplements, wherein the act of automatically determining comprises:
    comparing the tissue analysis results to the nutritional profile for a particular plant;
    identifying deviations from the target nutritional profile; and
    selecting the entries from the expert database such that the selected entries describe actions that will cause nutrient levels in the plant to approach the target nutritional profile.

13. The method of claim 1 wherein the act of using the tissue analysis results to select entries is performed using computer-implemented actions comprising:
    capturing the tissue analysis results in a spreadsheet format;
    loading a target nutritional profile associated with a particular plant and growth stage into the spreadsheet;

using the spreadsheet, comparing the captured tissue analysis results to a target nutritional profile to identify nutrients shortfalls;

for each nutrient shortfall, identifying one or more supplements that provide the nutrient;

cross-checking each identified supplement against other identified supplements to identify contraindicated supplements;

selecting a set of supplements that are not contraindicated within the selected set; and computing custom application directions for each selected supplement, the application directions including information about timing of the application over the season and mixing directions.

14. A plant nutrient management service comprising:

receiving plant tissue samples;

performing tissue analysis on the received samples to identify a current nutrient profile for the plant;

comparing the current nutrient profile to a desired nutrient profile to identify deviations; and considering the identified deviations together, generating a nutritional supplement plan to cause the plant nutrient profile to approach the desired nutrient profile.

15. A system for managing plant nutrients comprising:

an interface for receiving plant tissue analysis reports comprising raw data about current nutrient levels in a plant;

an expert database comprising a plurality of entries, wherein at least some entries are associated with a particular nutrient product and indicating nutrient supplement regimens for the associated product;

product selection logic acting on the current nutrient levels to identify shortfalls between current nutrient levels and desired nutrient levels, and identify entries in the expert database indicating regimens suitable to achieve the desired nutrient levels; and prioritization logic acting on the identified entries to select from the identified entries a subset of entries that are suitable to achieve the desired nutrient levels of particular nutrients in favor of other nutrients.

16. The system of claim 15 further comprising:

interaction logic acting on the identified entries to remove entries associated with nutrient products having contraindicating interactions.

17. The system of claim 15 further comprising:

mandatory rules logic that selects particular entries from the expert database based upon mandatory rules associated with a particular nutrient product.

18. The system of claim 15 further comprising:

time-of-application logic that selects particular entries from the expert database based upon plant-specific information that contraindicates application of a nutrient during the current season.

* * * * *